United States Patent
McGlasson

(10) Patent No.: US 8,795,028 B2
(45) Date of Patent: Aug. 5, 2014

(54) MAGNETIC SPINDLE FOR MACHINE TOOL

(75) Inventor: William D. McGlasson, Caledonia, NY (US)

(73) Assignee: The Gleason Works, Rochester, NY (US)

(*) Notice: Subject to any disclaimer, the term of this patent is extended or adjusted under 35 U.S.C. 154(b) by 1976 days.

(21) Appl. No.: 11/243,264

(22) Filed: Oct. 4, 2005

(65) Prior Publication Data

US 2006/0073766 A1  Apr. 6, 2006

Related U.S. Application Data

(60) Provisional application No. 60/615,838, filed on Oct. 4, 2004.

(51) Int. Cl.
*B24B 51/00* (2006.01)

(52) U.S. Cl.
USPC ................................. 451/5; 451/47

(58) Field of Classification Search
USPC ............... 451/5, 47, 114; 310/103–105, 152; 464/29; 173/211, 213; 403/DIG. 1
See application file for complete search history.

(56) References Cited

U.S. PATENT DOCUMENTS

| | | | |
|---|---|---|---|
| 3,099,901 A | 8/1963 | Hunkeler | |
| 3,142,940 A | 8/1964 | Rebeski | |
| 3,717,958 A | 2/1973 | Ellwanger et al. | |
| 3,807,094 A | 4/1974 | Ellwanger et al. | |
| 5,158,279 A * | 10/1992 | Laffey et al. | 271/272 |
| 5,562,528 A * | 10/1996 | Ueyama et al. | 451/11 |
| 5,609,058 A | 3/1997 | Gnadt et al. | |
| 5,690,519 A | 11/1997 | Chen | |
| 5,747,902 A * | 5/1998 | Takara | 310/75 D |
| 6,120,355 A * | 9/2000 | Stadtfeld et al. | 451/47 |
| 6,218,751 B1* | 4/2001 | Bohlin | 310/90.5 |
| 6,481,508 B2* | 11/2002 | McGlasson et al. | 173/211 |
| 2004/0066107 A1* | 4/2004 | Gery | 310/103 |
| 2004/0130228 A1* | 7/2004 | Chang | 310/103 |
| 2005/0200207 A1* | 9/2005 | Hasegawa et al. | 310/10 |

FOREIGN PATENT DOCUMENTS

| | | |
|---|---|---|
| DE | 1121192 | 1/1962 |
| DE | 19917134 A1 * | 10/2000 |
| EP | 0061086 | 9/1982 |
| EP | 0631366 | 12/1994 |
| GB | 2087164 | 5/1982 |

OTHER PUBLICATIONS

International Search Report and Written Opinion for PCT/US2006/005391.

* cited by examiner

*Primary Examiner* — Robert Scruggs
(74) *Attorney, Agent, or Firm* — Robert L. McDowell

(57) ABSTRACT

A spindle for a machine tool comprising a outer spindle portion and an inner spindle portion with each of the outer spindle portion and the inner spindle portion being rotatable relative to one another about the same axis. The outer spindle portion and the inner spindle portion each include a plurality of magnets that are arranged in an opposing manner with respect to one another whereby rotation of one portion of the spindle will induce rotation in the other portion of the spindle due to the attraction force between the magnets.

1 Claim, 2 Drawing Sheets

MAGNETIC SPINDLE FOR MACHINE TOOL

This application claims the benefit of U.S. Provisional Patent Application No. 60/615,838 filed Oct. 4, 2004.

FIELD OF THE INVENTION

The present invention is directed to machine tools and in particular to spindles for machine tools such as those for testing, lapping or grinding of gears.

BACKGROUND OF THE INVENTION

Lapping is a well established process for finishing the tooth surfaces of bevel gears. It is a process that provides an economical alternative to other hard finishing processes for bevel gears and it has been used in all areas except for some aircraft applications.

In the lapping process, a pinion and ring gear are mounted, via appropriate workholding equipment, to respective spindles in a lapping machine, which has the same basic design as a testing machine. The spindles may be of the direct drive type of may be driven by a motor, gear train, or belt and pulley system as is known to the skilled artisan. In most instances of rolling of the gearset, the pinion is the driving member and the ring gear is braked. The gears are rolled in mesh and lapping compound, which can be a mixture of oil (or water) and silicon carbide or similar abrasive, is poured into the meshing zone. Examples of lapping and/or testing machines can be found in U.S. Pat. No. 3,099,901 to Hunkeler; U.S. Pat. No. 3,142,940 to Rebeski; U.S. Pat. No. 3,717,958 and U.S. Pat. No. 3,807,094 to Ellwanger et al.; U.S. Pat. No. 5,609,058 to Gnadt et al., and U.S. Pat. No. 6,120,355 to Stadtfeld et al.

Most lapping and testing machines have three degrees of freedom available for realizing relative motion between a ring gear and pinion. The first freedom being relative movement in the direction of the ring gear axis which shall be referred to as direction G or the G axis, the second freedom being relative movement in direction of the pinion axis which shall be referred to as direction H or the H axis, and the third degree of freedom being distance between the ring gear and pinion axes which shall be referred to as direction V or the V axis. The direction V is also known as the "hypoid offset."

In lapping or testing processes, relative movement in the V and H directions effect positional changes in the contact pattern of the members of the gearset, in effect modifying the contact pattern. Lapping involves rotating the gear members in mesh and under a load with contact at a desired position on the tooth surfaces. Thus, the members are located at particular V and H positions along with a particular G axis position to effect the desired backlash. As the gear set is lapped, contact is shifted toward one of the outer (heel) or inner (toe) portions of the tooth surface by changing the V and H settings as necessary to effect such a shifting of the contact position. As V and H are changed to effect the shifting, the G axis position must also be changed to maintain the desired backlash.

Lapping operations may be carried out at pinion spindle speeds ranging from about 1000 RPM to about 4000 RPM. At the higher speeds (for example 2500-4000 RPM), imperfections in spindle construction, drive train construction, gear set motion transmission error, or running conditions, although slight, can be magnified to produce undesirable periodic changes in driving moments which can build to amplitude levels such that the tooth bearing patterns in the finished product become difficult to control by the lapping process.

One solution to the above problem is addressed in U.S. Pat. No. 3,807,094 to Ellwanger et al. wherein a lapping machine comprises an elastomeric coupling mounted between a pair of mounting blocks on the spindle associated with a braking means (usually the driven spindle to which a gear member is mounted). The elastomeric coupling twists, thus allowing one mounting block to rotate relative to the other mounting block, to isolate and absorb any aberrations in rotational moments due to braking of the spindle or other imperfections as discussed above.

The elastomeric coupling discussed above exhibits a fixed combination of damping and spring characteristics which are not necessarily well matched to the spindle and gear inertia. Therefore, where undesirable effects are best isolated and absorbed by controlling the total system dynamics in terms of inertia, damping and spring rate, an elastomeric coupling may provide little relief of the problem.

European Patent Application No. 0061086 discloses a spindle insert supported by an elastic element that adjusts to vibrations caused by the meshing action of gear members mounted on the machine spindles because of the lower mass moment of inertia of the spindle insert. The disclosed system is a passive system reacting only to vibrations of meshed gears on the machine.

U.S. Pat. No. 6,481,508 to McGlasson et al. teaches a machine tool spindle comprising a rear spindle portion and a forward spindle portion, with one or more spring elements extending between the rear spindle portion and the forward spindle portion. The relative rotational position of the rear and forward spindle portions is controlled during machine operation to effect a predetermined deflection of the spring elements thereby resulting in a predetermined winding-up of the spring elements and the creation of a desired and controllable amount of torque between members of a meshed gearset comprising a first gearset member mounted on the first spindle and a second gearset member mounted on the second spindle.

It is known for machines to employ a mechanical brake on the gear spindle, or electronic torque control on the gear spindle motor, to control the load applied between the teeth of the gearset during testing or lapping. However, these methods have not led to good control of the dynamic load variations occurring as a function of gear or pinion rotation and tooth-to-tooth rolling transitions.

SUMMARY OF THE INVENTION

The present invention is directed to a spindle for a machine tool comprising a rear spindle portion and a forward spindle portion with each of the rear spindle portion and the forward spindle portion being rotatable relative to one another about the same axis. The rear spindle portion and the forward spindle portion each include a plurality of magnets that are arranged in an opposing manner with respect to one another whereby rotation of one portion of the spindle will induce rotation in the other portion of the spindle due to the attraction force between the magnets.

DETAILED DESCRIPTION OF THE PREFERRED EMBODIMENT

The details of the present invention will now be discussed with reference to the accompanying drawings.

Figure 1:
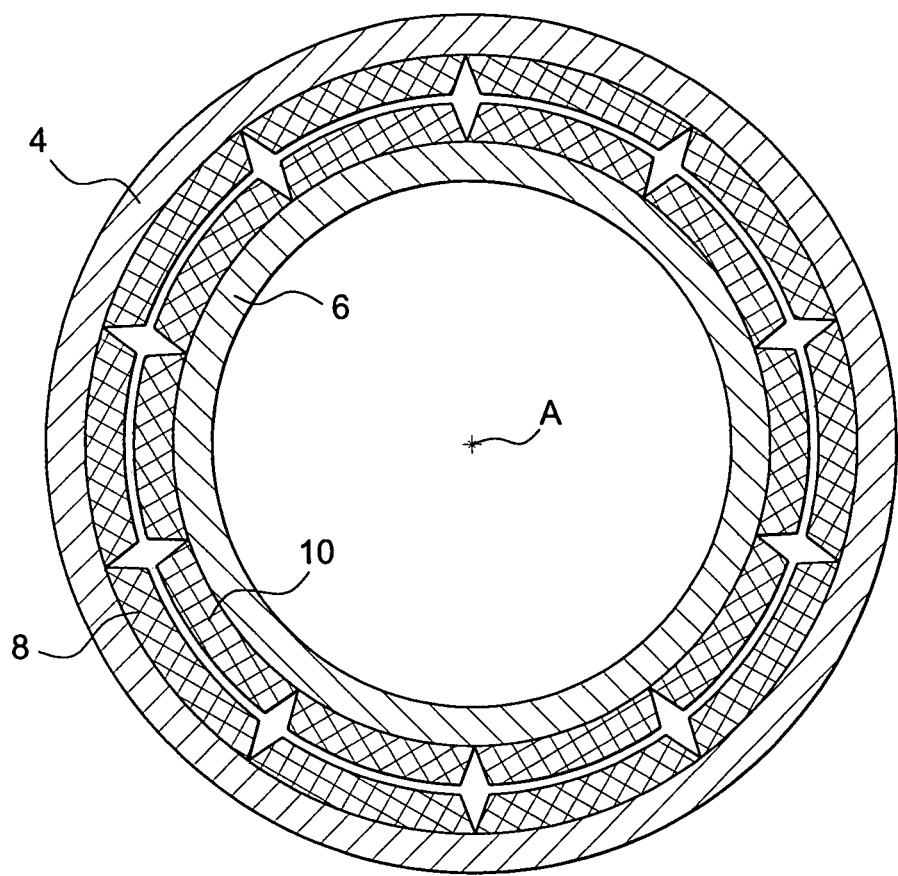
FIG. 1 end-view representation showing the relationship of the inner and outer spindle members with their respective magnets.

The inventive spindle 2 includes two rotary members, a rear or outer member 4 and a forward or inner member 6 each rotatable about the same axis A as shown in FIG. 1. Affixed to each spindle member is a plurality, N, of permanent magnets 8, 10 with the number N of magnets being the same on each spindle member. Thus, the magnet pitch, P, becomes 360/N degree. A small air gap separates the magnets. When the poles of inner and outer magnets line up, the torque between the two rotational members is zero, and when one of the cylinders is rotated relative to the other (wind-up), a restoring torque is developed as a function of this rotation.

Figure 2:
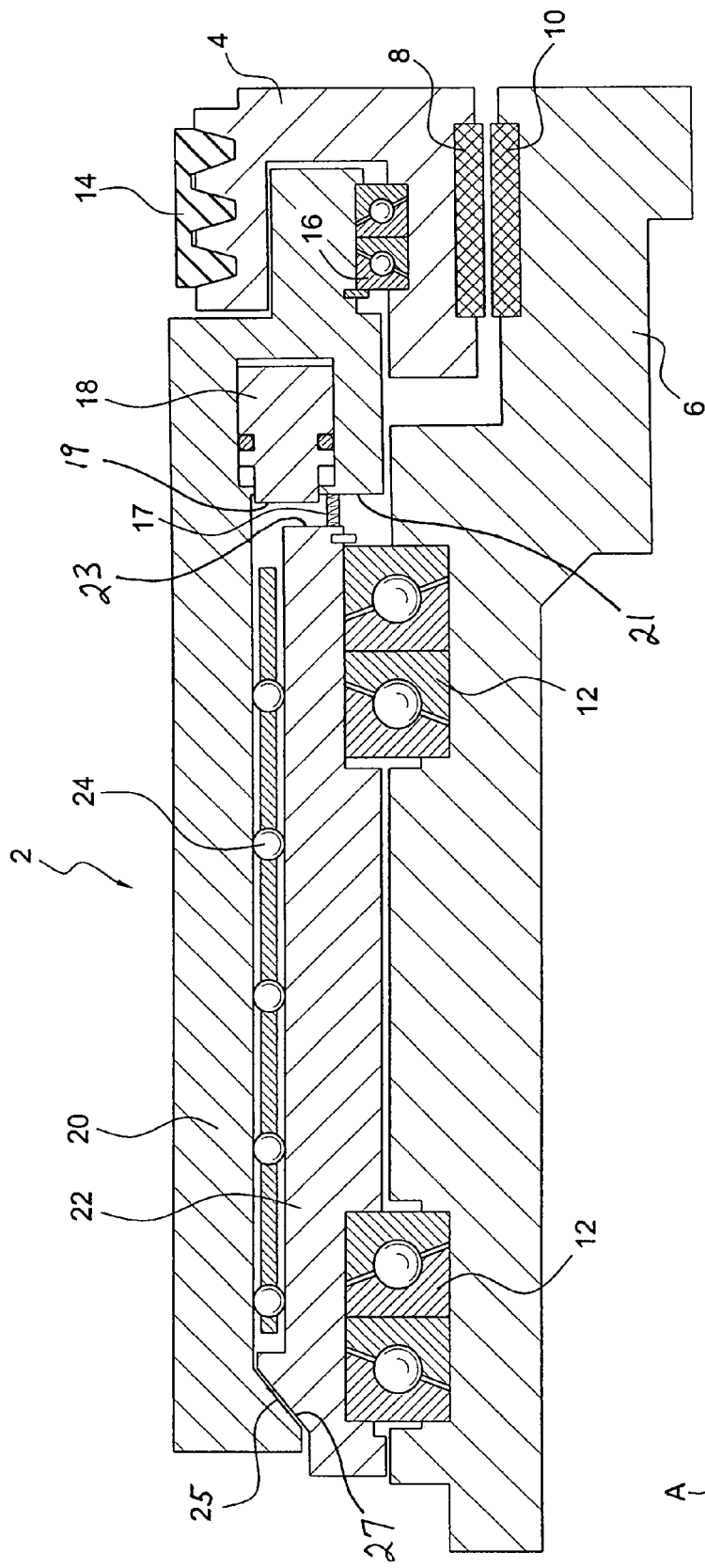
FIG. 2 schematically illustrates an axial cross-section of the inventive spindle showing inner and outer spindle members with their respective magnets.

FIG. 2 shows the rotary members incorporated into a machine tool spindle such that a tool or work piece and a workholding fixture (not shown) are mounted into the forward spindle member 6 that is supported on rotational bearings 12 and a spindle motor drive pulley 14 is mounted to the rear spindle member 4 supported on rotational bearings 16. It is to be understood that the terms "rear" and "front" are relative terms selected to describe the relative positional relationship of the components of spindle 2 and are not indicative of any particular orientation of the spindle 2. The spindle 2 may be oriented in any position and is not limited to the generally horizontal orientation illustrated by FIG. 2. Spindle 2 also includes outer stationary housing 20, inner element 22 and ball sleeve 24 that allow axial movement of forward spindle member 6 as will be described further below.

Torque applied to the tool or work piece from the spindle motor, therefore, is transferred through the magnets and results in a rotational displacement or wind-up of one spindle member relative to the other. For torques within the normal range of the machine-tool process, the wind-up would amount to less than +/−P/2 deg (half the magnet pole pitch.) In crash situations, however, higher torques could be developed sufficient to cause the spindle to "cog" one or more poles, protecting the machine by decoupling the motor and forward spindle and limiting the forces developed.

Alternative to motor and belt 14 drive or gearing, the rear spindle member 4 may be an element of a direct drive motor (not shown) in a computer numerical control (CNC) system and a gear to be tested or lapped is chucked into workholding equipment (not shown) that is bolted to the forward spindle member 6. An example of such a machine is illustrated and described in heretofore referenced U.S. Pat. No. 6,120,355 or U.S. Pat. No. 6,481,508 the disclosures of which are hereby incorporated by reference.

The above discussion is directed to providing a torque between the gearset members by controlling a torque applied to one spindle, usually the gear member (member having more teeth) spindle. This applied torque could come from a mechanical brake, hydraulic motor, electronic motor control, or other means. The objective of this approach is to maintain a desired torque regardless of the position or speed imposed on, for example, the gear member spindle (through the gear mesh) by the pinion member spindle.

Although the inventive spindle can be operated under such known torque control means as discussed above, it may also be operated under a control method which has as its objective to control the position of, not the torque applied to, one of the machine spindles, for example, the gear member spindle. In this method, the gear member spindle position is controlled relative to the pinion member spindle position by means such as CNC control. An option is to operate one spindle as a slave to the other spindle such as is accomplished by an electronic gear box (EGB). Another option is to control both spindles independently but in a command-coordinated fashion.

In the position-control method, the rotation of the rear spindle 4 is locked in a timed relationship with the rotation of the pinion spindle according to the ratio of the number of teeth on the parts to be run in the machine. Thus, the objective is to control the position of, not the torque applied to, the rear spindle 4. As the pinion member is turned at some speed, the gear member is kept in coordination with the pinion (according to their ratio) by the CNC control. This positional relationship may be referred to as the "coordinated position." Moreover, the gear member spindle can be commanded to include additional rotational components which, in effect, advance or retard the gear rotation relative to the pinion. These additional rotational components may be referred to as the "windup commands."

An advantage of employing magnetic elements for controlling torque is that motion transmission errors associated with any real gearset lead to small changes in the relative position of the opposed magnets on each spindle member. Since these deflections are absorbed by the movement of the spindle members, and any other compliant element such as a damper, as compared to incompliant spindles, the motion transmission errors produce a much smaller effect on the particular process (e.g. lapping or testing). It can be seen that the physical dynamic behavior of the magnets and spindle elements can be beneficially used in the lapping or testing process. The magnetic elements 8, 10 provide a force that opposes and is a function of rotary displacement. By allowing the gearset motion transmission error to dynamically deflect the magnets, the torque does not remain exactly constant at the nominal value but, in the case of the magnets, increases with greater deflection and decreases with reduced deflection. This effect can be used to improve the gearset motion transmission error (for example, gear run-out and pinion run-out) by lapping high spots with greater force than the low spots.

Appropriate selection of the magnets, damper (if any) and inertia of the forward spindle can deliver the desired response to motion-transmission error. From the perspective of the pinion delivering motion-transmission errors to the gear, the gear can react primarily like an inertia, primarily like a spring, primarily like a damper, or a combination of any or all of the above, according to the well known dynamic analysis of a second-order system. The type of reaction, moreover, is a function of the frequency content of the motion-transmission error.

In such a second-order system, if the excitation frequency (the imposed motion transmission error) is sufficiently high, then the forward spindle and gear will act like an inertia. If the frequency is sufficiently low, it will behave like a spring. How, and over what frequencies, it transitions from the low-frequency spring-like behavior to the high-frequency inertia-like behavior is governed by the selection of spring, damper and inertia values.

The inertial response to a periodic motion error should, in general, be avoided in the lapping process, since the force is 180 degrees out-of-phase with the imposed motion transmission error. The spring-like response of the magnets is good, in general, since the force is directly in-phase with the excitation. In other words, if the response is inertial, a high spot is lapped with less force and a low spot is lapped with greater force. This means that the high spot is not removed by lapping, but can actually be made more pronounced. On the other hand, if the response is like a spring, the high spot is lapped with more force and the low spot is lapped with less force such that lapping can reduce the magnitude of the motion error.

The force variations induced by gearset motions are superposed on top of the average force level that is desired. The average force between the gear members on the machine, then, is controlled by controlling the displacement of the compliant elements, i.e. the magnets, found between the rear spindle member 4 and the forward spindle member 6. In addition to controlling the position of the rear spindle 4 in coordination with, or as a slave to, the pinion spindle position, additional motion of the rear spindle 4 can be effected while the parts are in mesh to control the relative displacement, velocity and acceleration of the forward spindle 6 relative to the rear spindle 4. By knowing the dynamic response of the particular magnets and any damping elements, the displacement trajectories that produce the desired force between the gear set members can be determined.

The inventive spindle may also allow axial displacement between its two members 4, 6. In many machine tool applications, it is advantageous that the work piece or tool spindle has a mode of operation with an axial freedom or compliance. This usually small amount of axial freedom combined with a mechanical spring 17 and/or piston 18 force (FIG. 2) can allow certain types of probing operations. Forward displacement is stopped by contact between complementary abutment surfaces 25, 27 while rearward displacement is stopped by contact between inner element surface 23 and either piston surface 19 or stationary portion surface 21. A work piece can be gently brought into contact with its mate or a tool be brought gently into contact with a work piece. A sensor or linear transducer often monitors this axial compliant motion. In the case of bevel and cylindrical lapping and roll-testing machines, the gear-set members are often rolled together with teeth in full double-flank contact to accomplish a type of gear quality check. In such cases, the axially compliant spindle is allowed to float in and out according to gearset rolling deviations while a light axial spring or piston force keeps the gear members together.

It is further noted that the requisite axial force may sufficiently be provided by the magnets 8, 10 such that any axial displacement of forward spindle member 6, which will displace the relative axial alignment of magnets 8, 10, may be opposed by the inherent force between the magnets urging them to return to axial alignment. In this case, a spring 17 and/or piston 18 is not necessary for providing the required force necessary to permit the forward spindle member 6 to float.

In order to accomplish these probing operations most responsively and with lightest forces, it is an objective to minimize the mass and friction involved with this axial compliant motion. Therefore, limiting the axial motion to just the forward spindle member 6, via inner element 22 and ball sleeve 24, can be accomplished in the present magnetic spindle allowing not just the rotational but also the axial compliant displacement to occur between the two members 4, 6. This provides that the rearward spindle 4, spindle motor (not shown) and belt 14 or gear system can remain axially stationary, simplifying the spindle and its driveline design. The axial motion of the forward spindle 6 is not limited to ball sleeves 24 but can be supported by any number of known means for guiding and supporting linear motion, including roller-sleeves, etc.

In cases where axial motion of the forward spindle member 6 is not desired, one or more pistons 18 may be extended to force an abutment surface 27 of inner element 22 into engagement with a complimentary abutment surface 25 of outer spindle stationary portion 20.

Although the present invention has been discussed and illustrated with respect to a lapping machine, the inventive spindle and control process may also be included in a testing machine for cylindrical, bevel, and hypoid gears as well as in other types of finishing machines such grinding, shaving or honing machines. In a testing machine, the tooth surfaces of one member of the pair, usually the gear member, are coated with a marking compound and then the pair is run together under a light load. Marking compound will be removed from areas of the gear tooth surface which come into contact with tooth surfaces of the mating pinion member resulting in a contact pattern or "footprint" being revealed on the tooth surfaces of the gear. The position and length of the contact pattern can then be evaluated.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A spindle for a machine tool, said spindle being rotatable about an axis of rotation and comprising:
    an outer spindle portion;
    an inner spindle portion, with each of said outer spindle portion and said inner spindle portion being rotatable about said axis relative to one another;
    a first plurality of magnets arranged in a ring shape about an inside surface of said outer spindle portion and a second plurality of magnets arranged in a ring shape about an outside surface of said inner spindle portion, said first plurality and said second plurality being the same number,
    said first plurality of magnets and said second plurality of magnets facing one another,
    wherein the second plurality of magnets on said inner spindle portion are radially spaced from the first plurality of magnets on said outer spindle portion, said inner spindle portion being movable during operation of said spindle with respect to said outer spindle portion along said axis of rotation,
    wherein said inner spindle portion is axially movable over a predetermined amount via an inner element axially movable between defined stop positions,
    wherein said defined stop positions are positioned on one or more inner surfaces of a stationary housing arranged radially outward of said inner element, and
    wherein at least one of the inner surfaces includes a spring and/or piston for moving said inner element and inner spindle portion.

* * * * *